United States Patent [19]
Roberts et al.

[11] Patent Number: 5,277,296
[45] Date of Patent: Jan. 11, 1994

[54] WARE TRANSFER MECHANISM

[75] Inventors: Douglas J. Roberts, Ellington; Kenneth L. Bratton, Enfield; Gary R. Voisine, East Hartford, all of Conn.

[73] Assignee: Emhart Glass Machinery Investments Inc., Wilmington, Del.

[21] Appl. No.: 66,864

[22] Filed: May 25, 1993

[51] Int. Cl.⁵ .............................................. B65G 47/26
[52] U.S. Cl. ................................. 198/457; 198/475.1
[58] Field of Search ............... 198/457, 475.1, 476.1, 198/477.1, 479.1, 483.1, 482.1, 474.1, 459

[56] References Cited

U.S. PATENT DOCUMENTS

| | | | |
|---|---|---|---|
| 1,981,641 | 11/1934 | Benoit | 198/479.1 X |
| 2,649,183 | 8/1953 | Steck | 198/482.1 X |
| 2,912,093 | 11/1959 | Lauck | 198/457 X |
| 3,073,444 | 1/1963 | Bielinski et al. | 209/524 |
| 3,701,407 | 10/1972 | Kulig | 198/457 |
| 3,900,096 | 8/1975 | Nack et al. | 198/457 |
| 4,411,353 | 10/1983 | McDole | 198/457 X |
| 4,776,448 | 10/1988 | Kulig | 198/457 X |

Primary Examiner—James R. Bidwell
Attorney, Agent, or Firm—Spencer T. Smith

[57] ABSTRACT

A ware transfer mechanism is disclosed which includes equally spaced pockets which have a fixed rear wall and a side wall advanceable from a retracted position to an advanced position as the pockets are displaced along an arcuate path across the transfer plate overlapping a first conveyor and transverse cross conveyor. Containers will be displaced by the side wall to locate the container in line with the containers on the cross conveyor.

5 Claims, 3 Drawing Sheets

WARE TRANSFER MECHANISM

The present invention relates to the manufacture of glass bottles (ware) on I.S. (Individual Section) or H-28 machines where bottles are deposited, at a predetermined spacing, on one conveyor and transferred to a second conveyor which is to carry the bottles to processing stations. This invention more particularly relates to a ware transfer mechanism which will transfer the bottles from the first conveyor to the second conveyor.

State of the art ware transfer mechanisms are shown in U.S. Pat. Nos. 4,776,448 and 3,701,407. With such ware transfer mechanisms, over 400 soda bottles can be transferred per minute but, if this mechanism is to keep pace with productivity gains, it must be able to transfer 600 soda bottles per minute.

It is accordingly an object of the present invention to provide a ware transfer mechanism that will be able to transfer glass containers at a higher rate.

Other objects and advantages of the present invention will become apparent from the following portion of this specification and from the accompanying drawings which illustrate in accordance with the mandate of the patent statutes a presently preferred embodiment incorporating the principles of the invention.

Referring to the drawings.

A conveyor 10 runs past an I.S. machine or any other machine that makes glass containers (not shown) and formed bottles 12 are deposited onto the conveyor to establish a line of approximately equally spaced (S1) bottles. These bottles are to be transferred to a second conveyor which in the preferred embodiment is a perpendicularly related cross conveyor 14 which has a velocity V2 slower than the velocity V1 of the first conveyor. As a result of this lower velocity, the bottles carried on the cross conveyor will have a smaller spacing S2. As the bottles are transferred from the first conveyor to the cross conveyor the bottles slide over a stationary plate 16 which overlies both conveyors.

Figure 2:
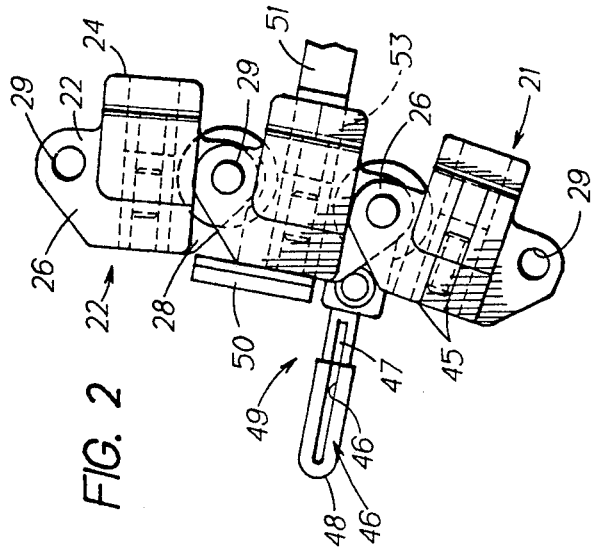
FIG. 2 is a top view of a portion of the ware transfer conveyor.
Figure 4:
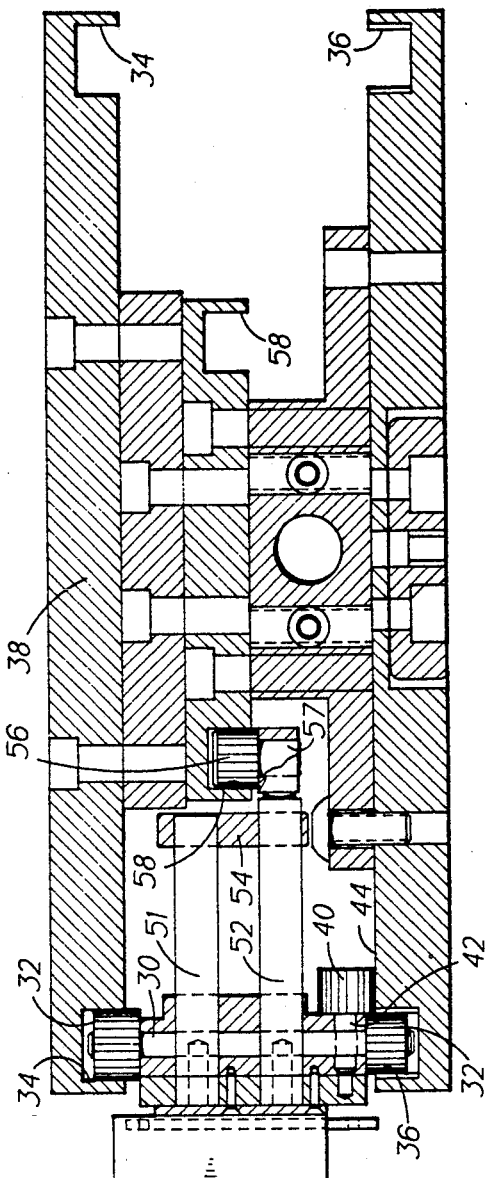
FIG. 4 is a view taken at 4—4 of FIG. 1.
Figure 3:
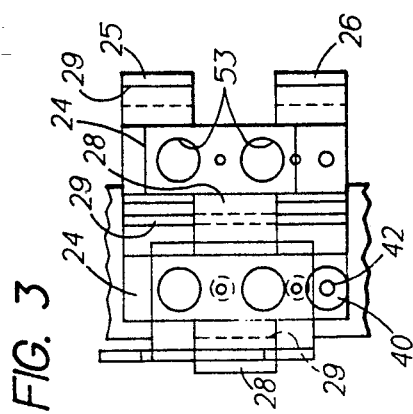
FIG. 3 is a rear view of a pair of ware transfer conveyor links.

The approximately 90° transfer is achieved with a ware transfer mechanism 20 which includes a continuous chain 21 (FIG. 2) made from interconnected links 22 each having a central body 24 supporting vertically spaced linking elements 26 at one side and a centrally located linking element 28 at the other side. The linking elements 26, 28 have a vertical bore 29 so that adjacent links can be pivotally interconnected by a pin 30 (FIG. 4) extending through the axially aligned bores in the spaced linking elements 26 of one link and the central linking element 28 of another link. Rollers 32 secured to the top and bottom of these pins 30 are received within upper 34 and lower 36 channels (FIG. 4) defined in a chain guide frame 38. The vertical position of the chain is defined by support rollers 40 which rotate about a horizontal shaft 42 secured to the central body 24 and which ride along a horizontal surface 44 of the chain guide frame. Secured to the outer surface of every third (for triple gob operation) or fourth (for double gob operation) central body 24 is a bracket 46 which has an outwardly extending pocket rear wall portion 47 which is covered with an adhesively secured cap of an aramid manmade fabric. The bottle carrying pocket 49 is completed with a vertical pocket side wall 50 which is secured to a pair of parallel horizontally extending upper and lower shafts 51, 52 which extend through the bracket 46 and are slidably received by a pair of horizontal through bores 53 defined in the link central body 24. These shafts 51, 52 are held together by suitable clips 54 and the longer lower shaft 52 supports a control roller 56 for rotation about a vertical shaft 57. The location of the side wall 50 relative to the rear wall 48 of the pocket 49 is controlled by a control channel 58 defined in the conveyor guide frame 38. While in the embodiment illustrated in FIG. 4, two shafts are utilized to prevent rotation of the sidewall, a single keyed shaft 59 (FIG. 6) can also be used.

Figure 1:
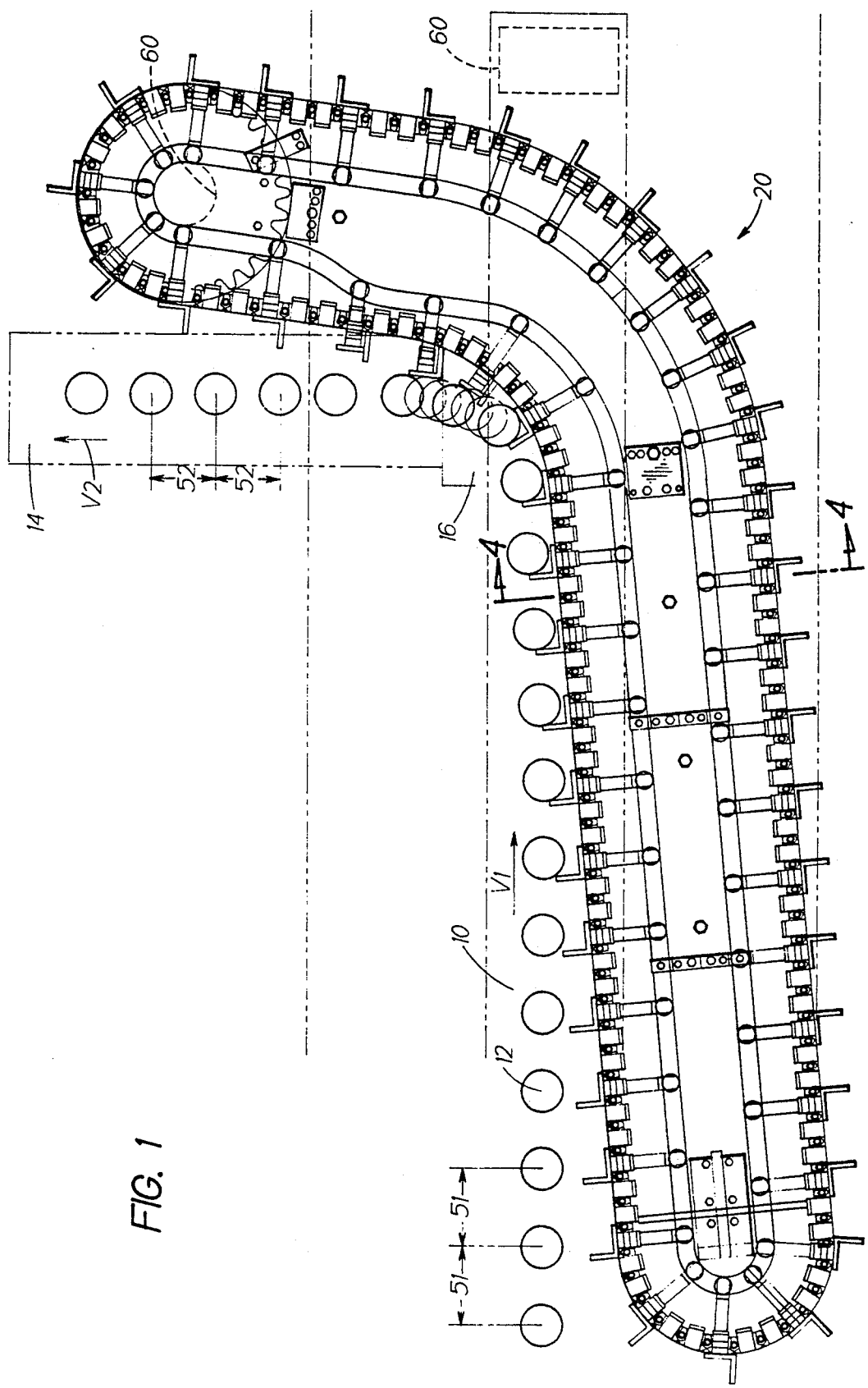
FIG. 1 is a top view of the ware transfer mechanism made in accordance with the teachings of the present invention with a bottle carrying pocket of the ware transfer conveyor and the transferred bottles incrementally displaced through the system.
Figure 5:
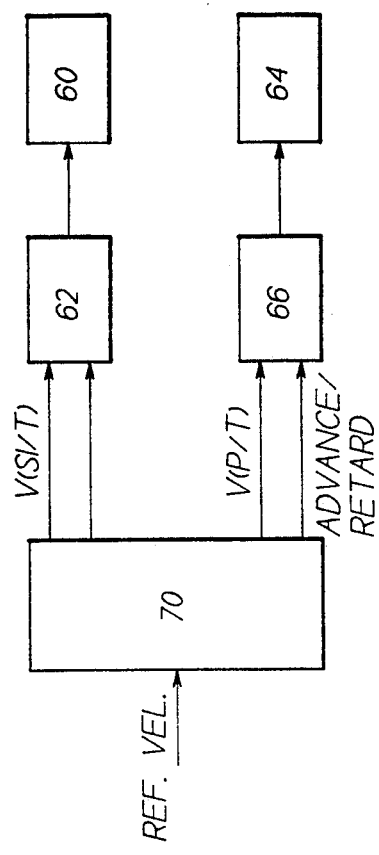
FIG. 5 is a schematic electronic diagram illustrating the controls for the ware transfer mechanism and I.S. conveyor drives.

As can be seen from FIG. 1, the first conveyor is driven by a motor 60 which is controlled by a motor control 62 which will receive a velocity (V) speed input and the ware transfer conveyor is driven by a motor 64 which is controlled by a motor control 66 which will receive velocity (V) and advance/retard inputs. The ware transfer conveyor follows a straight course at an angle to the first conveyor. When the machine is an I.S. machine and is operating in the triple gob mode producing three bottles in each section, these bottles may occupy a selected length on the first conveyor (13⅛" for example). Bottle pitch will accordingly be 4⅜". The ware transfer conveyor links have a 1½" pitch so that pockets can be located on a 4½" pitch (P) for triple gob operation and a 6" pitch for double gob operation. In one mode the control 70 defines velocity inputs of S1/T and P/T for motor controllers 62, 66 respectively so that as the first conveyor is displaced one pitch, a pocket of the ware transfer conveyor is also displaced one pitch. This means that the pocket will move slightly faster than the conveyor. The length of the lead in is selected so that the pocket will catch up to a bottle, (the catch up mode), capture it in the pocket and carry the bottle at an angle to the first conveyor towards the transfer plate 16. To properly locate the pocket relative to a spacing, the control also can supply an advance/retard signal to the ware transfer motor control 66 to adjust the phase as required. In a second mode, the ware transfer conveyor is displaced at a speed that is slower than the speed of the first conveyor so that each bottle will bump into the next finger which will thereafter hold the bottle back (the hold back mode).

Figure 6:
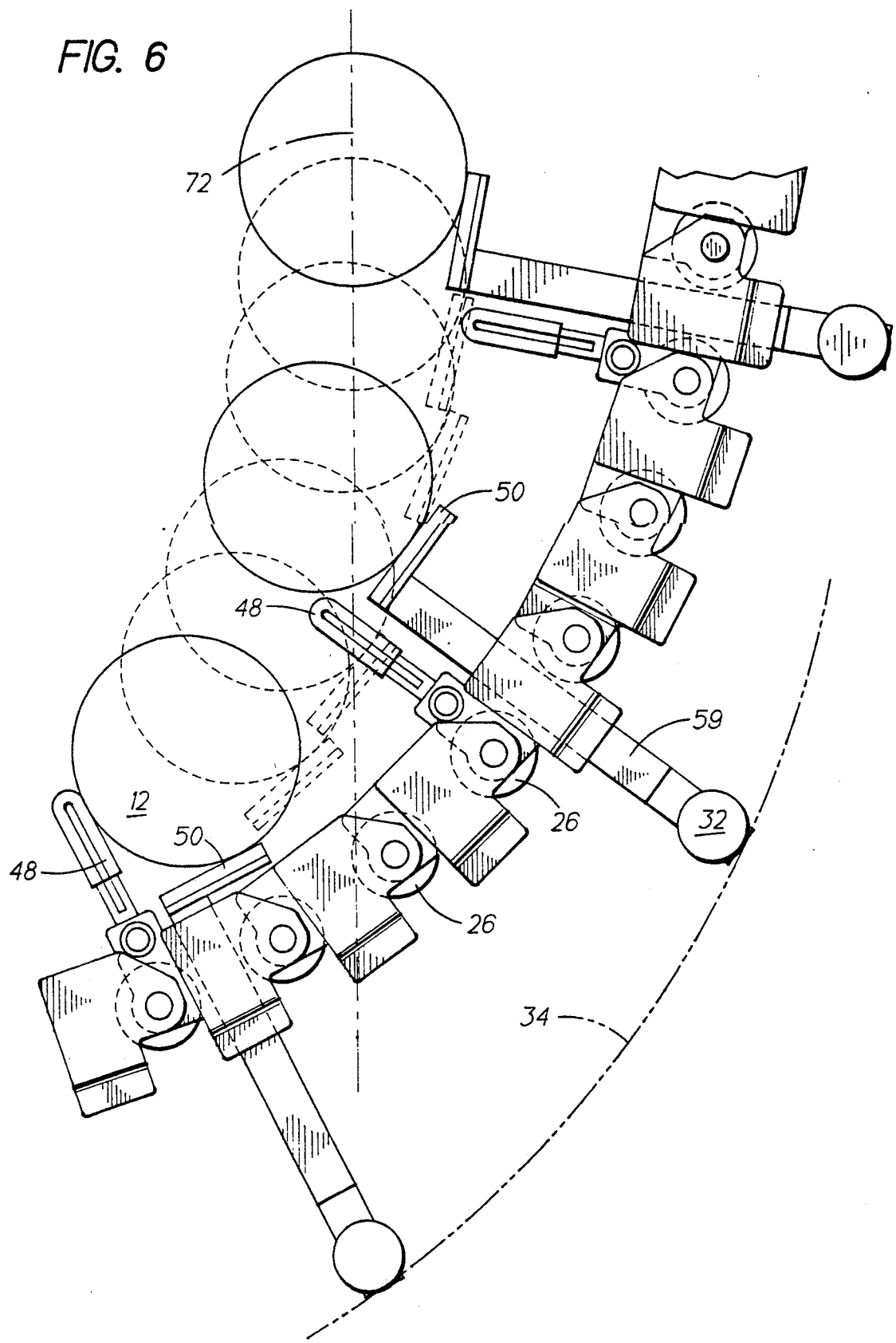
FIG. 6 is an enlarged showing of a portion of FIG. 1.

FIGS. 1 and 6 illustrate how a bottle is displaced across the transfer plate 16 onto the cross conveyor in the catch up mode. As shown in FIG. 1, the pocket begins to turn as the bottle approaches the transfer plate. As the center of the bottle approaches the center line 72 of the bottles on the cross conveyor and begins to cross the transfer plate the side wall is advanced to define a bottle path that will locate the center of the bottle on this center line when it is fully pushed onto the cross conveyor. The bottle will be on the cross conveyor when more than half of the bottle overlies the cross conveyor. The side wall continues to advance through this curve to maintain engagement with the bottle to stabilize it until it has transferred onto the cross conveyor and when fully advanced, passes the end of the rear wall or finger, thereby enabling passage of the finger past the bottle as the conveyor continues its movement at an angle to the cross conveyor. The ware transfer conveyor continues its displacement and before the pocket returns to the start location, the side wall will be fully retracted to its original location. In the hold up mode, the displaceable side wall performs in the same manner except that the bottle will be in engagement with the finger ahead of it rather than in engagement with the finger behind it. In this situation where bottle pitch is greater than pocket pitch, the pocket will be defined by a side wall and the finger or rear wall in front of it. The size of the side wall is selected so that it can push the container whether the mechanism is operating in the hold up or catch up modes.

We claim:

1. A ware transfer mechanism for transferring in line glass containers having an approximately uniform spacing on a first conveyor, across a transfer plate, onto an approximately transversely related cross conveyor with the glass containers in line and having an approximately uniform spacing comprising, a horizontally extending endless ware transfer conveyor including a plurality of container receiving pockets having a selected spacing, each of said pockets including an outwardly projecting wall having an outer free end and a perpendicularly related side wall displaceable from a retracted position defining with the outwardly projecting sidewall a full container receiving pocket to a fully advanced position whereat said side wall projects beyond the outer free end of said outwardly projecting wall, means for supporting said ware transfer conveyor so that the path of said free end of said pocket outwardly projecting wall will intersect the center line of the containers on the first conveyor, follow an arcuate path across the transfer plate intersecting the center line of the containers on the cross conveyor and be spaced from the containers on the cross conveyor, and means for displacing said side wall from said retracted position to said fully advanced position as the free end of said outwardly projecting pocket wall follows said arcuate path across the transfer plate to locate the containers on the center line of the containers on the cross conveyor.

2. A ware transfer mechanism according to claim 1, wherein each of said pockets is defined by an outwardly projecting wall and the next forward side wall.

3. A ware transfer mechanism according to claim 1, wherein each of said pockets is defined by an outwardly projecting wall and the next rearward side wall.

4. A ware transfer mechanism according to claim 1, wherein said ware transfer conveyor is displaced at a speed which is slower than the first conveyor and wherein each of said pockets is defined by an outwardly projecting wall and the next forward side wall.

5. A ware transfer mechanism according to claim 1, wherein said ware transfer conveyor is displaced at a speed which is faster than the first conveyor and wherein each of said pockets is defined by an outwardly projecting wall and the next rearward wide wall.

* * * * *